Jan. 28, 1969　　　H. PECTOR ET AL　　　3,424,487
GLASS TRANSPORTING RACK
Filed April 27, 1967　　　　　　　　　　　　　　　Sheet 1 of 3
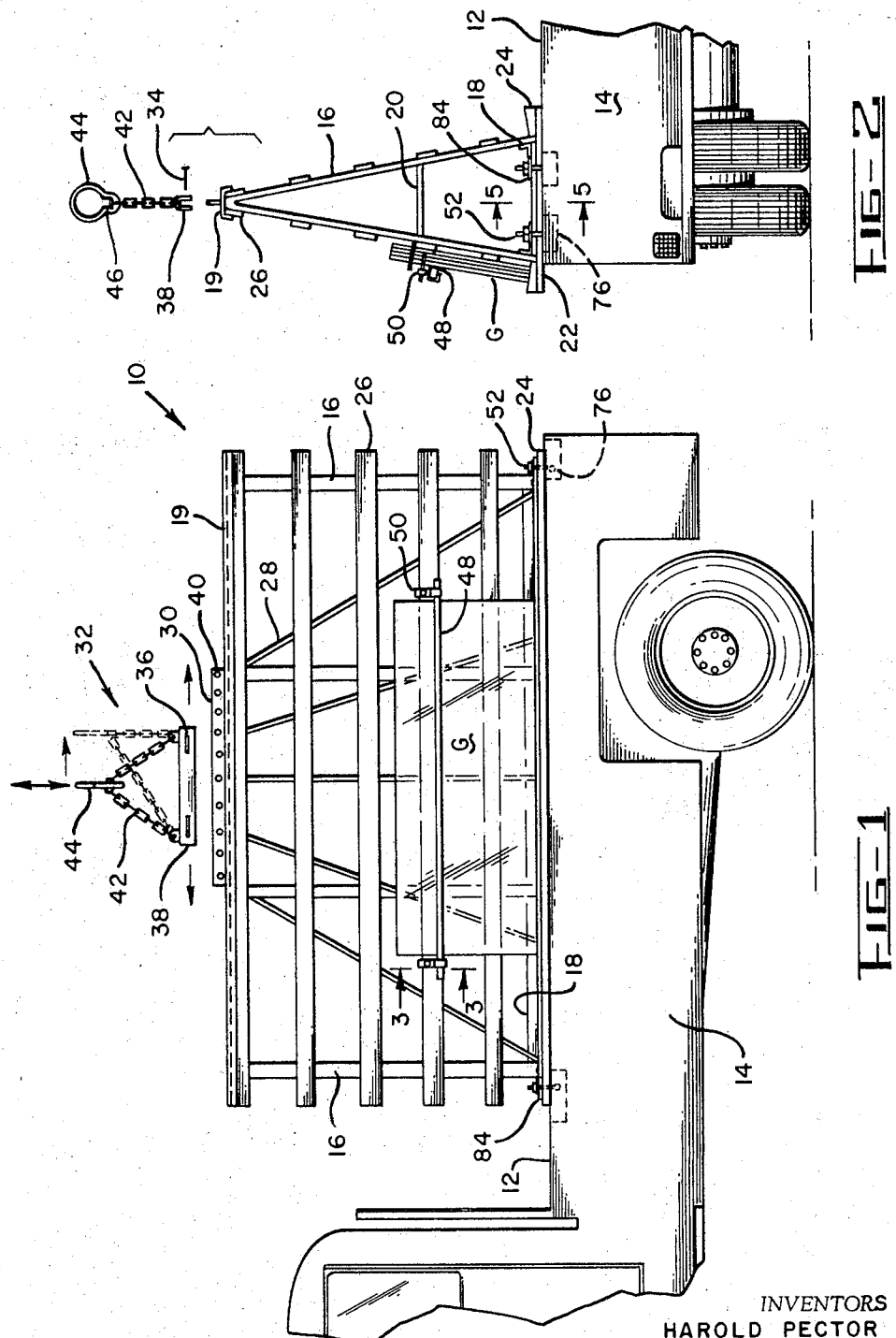
INVENTORS
HAROLD PECTOR
RUSSELL W. TAUSHECK
BY
ATTORNEYS

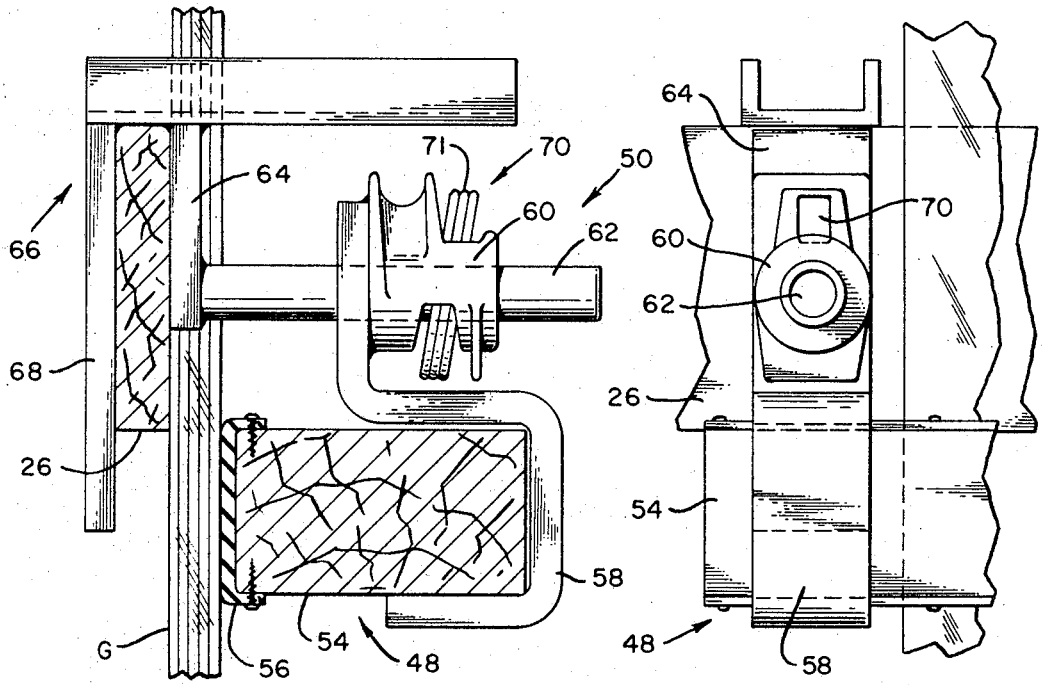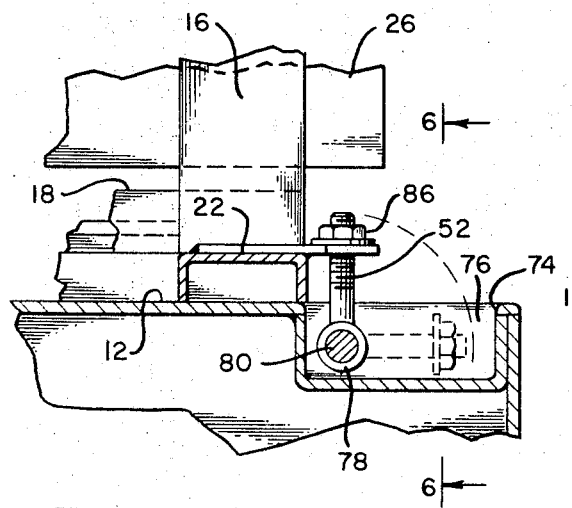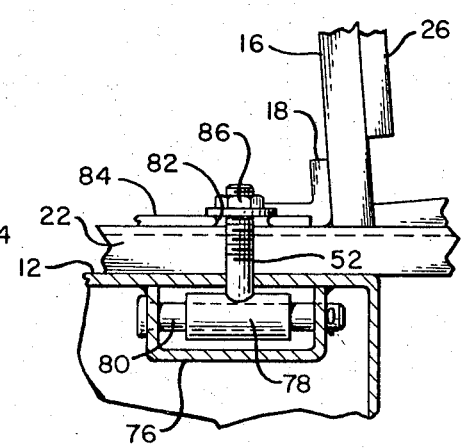

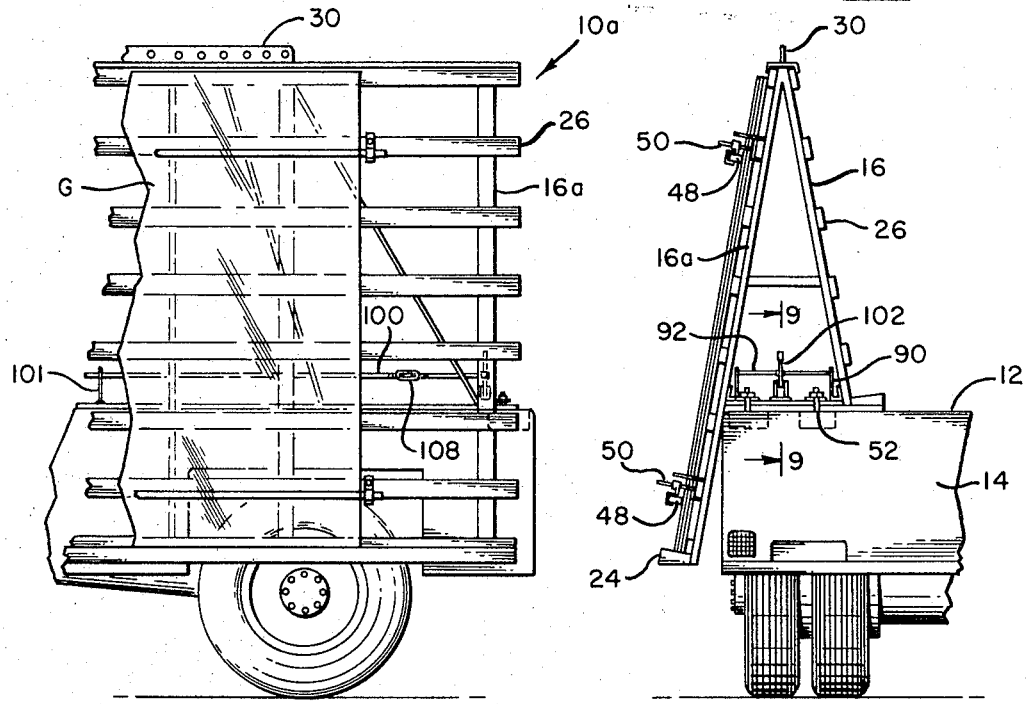
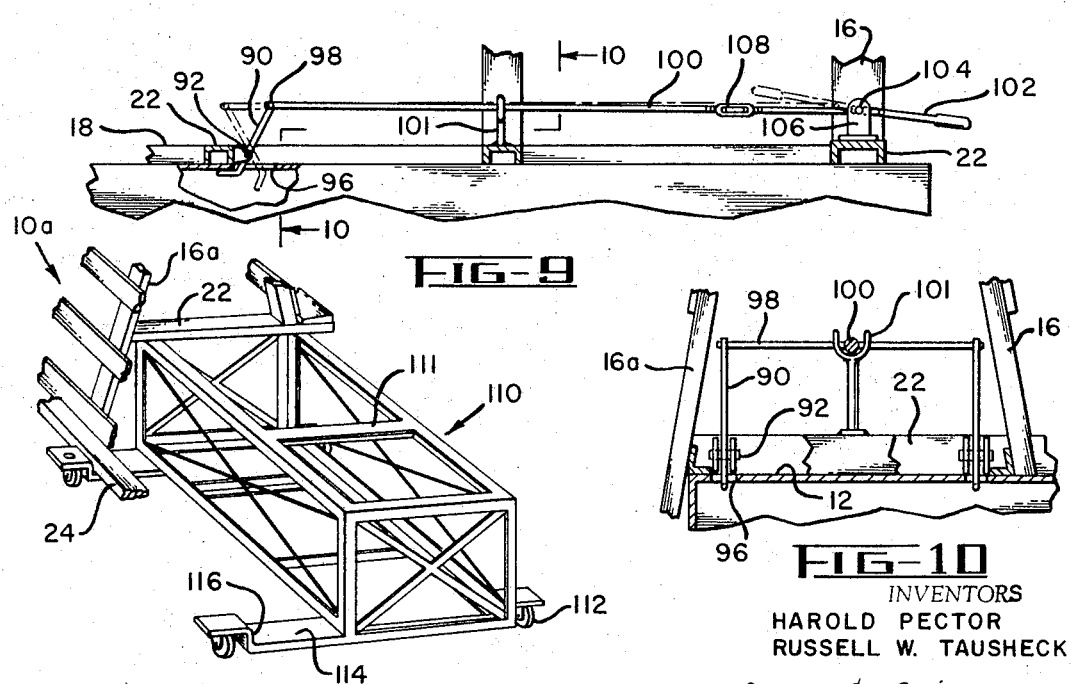

United States Patent Office 3,424,487
Patented Jan. 28, 1969

3,424,487
GLASS TRANSPORTING RACK
Harold Pector, Hayward, and Russell W. Tausheck, San Lorenzo, Calif., assignors to American Plate and Window Glass Distributors, Hayward, Calif., a corporation of California
Filed Apr. 27, 1967, Ser. No. 634,241
U.S. Cl. 294—67                 7 Claims
Int. Cl. B60p 1/64, 3/00; B66c 1/00

ABSTRACT OF THE DISCLOSURE

An A-frame glass transporting rack with adjustable bearing means for clamping glass sheets against an inclined surface. The ends of a chain are secured to a bar which is releasably secured in selected positions along the top of the rack in order to balance the load and to facilitate moving it by lifting on the chain. Complementary securing means, such as bolt or hook members, are provided to releasably secure the rack to the bed of a truck or other portable member.

Description

This invention relates to a glass transporting rack and, more particularly, to a rack for carrying sheets of glass or the like which may be loaded in a convenient location such as a warehouse and subsequently releasably secured to the bed of a truck.

Conventional means for transporting sheets of glass or the like comprise trucks on which are permanently mounted racks for carrying the sheets of glass. Such truck-mounted racks suffer obvious disadvantages in that they can be loaded only when the truck is available. Thus, in order to avoid excessive labor charges for idle time, it is necessary to have a sizeable fleet of trucks in order to insure that some will be empty and available for loading while others are en route to or from their destinations. In addition, it is necessary to provide adequate docking facilities conveniently located with respect to the area in which the glass is stored and prepared in order to expedite the truck loading time.

It is, therefore, an object of this invention to provide a glass carrying rack which may be easily and quickly loaded without requiring idle time of the truck and driver.

It is a further object of this invention to provide a glass carrying rack which may be loaded in immediate proximity to the place of glass storage or preparation.

It is a further object of this invention to provide a glass storage rack which may be quickly and easily removed from the bed of a truck into the place of glass storage and preparation.

It is a still further object of this invention to provide a glass storage rack which may be quickly and easily removed from a truck and replaced by one which is already loaded with glass for delivery.

It is a still further object of this invention to provide a glass transporting rack which may be secured to and released from the bed of a truck by actuation of securing means at the end of the rack.

It is yet a further object of this invention to provide a glass transporting rack which may be removed from the bed of a truck to condition the truck for other uses.

In carrying out this invention, we provide a glass storage rack of A-frame construction in cross-section to which is secured a bottom ledge on which glass panes are supported. Also secured along the length of the frame is a plurality of generally horizontal slats forming together an inclined surface against which the glass panes are leaned and clamped against displacement. Easily operated releasable clamping or bearing members hold the glass panes firmly against the slats and, when loaded, the racks may be transported by engaging and lifting of a chain loop which is secured to the top of the rack. In fact, the chain loop may be secured at various places along the top of the rack in order to compensate for any imbalance in load when transporting glass sheets of various sizes. Retractable bolts normally recessed below the level of the truck bed engage in complementary slotted bars on the rack to secure it in place after it is loaded and lifted on to the truck bed. Certain of the racks which are intended for transportation of particularly large sheets of glass are provided with a side higher than the other. Then, when secured onto the truck bed, it is disposed so that the high leg of the "A" clears the side of the truck and extends below the level of the bed. When removed from the truck, such racks may be conveniently supported and stored on a small dolly which is high enough to be moved about with the long leg of the "A" above ground level. As an additional feature on certain of the racks I provide hook members which are operated through a linkage from one end of the rack to engage complementary interlock portions on the truck and provide additional hold down support intermediate the ends of the rack.

Other objects and advantages of this invention will become apparent from the description following when read in conjunction with the accompanying drawings wherein:

FIG. 1 is a side elevation view of the truck and glass transporting rack embodying features of our invention;

FIG. 2 is an end view of the rack looking from the rear of the truck;

FIG. 3 is a section view taken along line 3—3 of FIG. 1;

FIG. 4 is an enlarged partial view showing releasable clamps for securing glass sheets in place on the rack;

FIG. 5 is a partial section view through the rack and truck bed showing releasable securing means;

FIG. 6 is a section view taken along line 6—6 of FIG. 5;

FIG. 7 is a partial elevation view showing another embodiment of our invention;

FIG. 8 is an end view of the embodiment of FIG. 7;

FIG. 9 is a section view taken along line 9—9 of FIG. 8;

FIG. 10 is a section view taken along line 10—10 of FIG. 9; and

FIG. 11 is a view in perspective showing an auxiliary transporting rack forming a feature of the invention.

Referring now to FIGS. 1 and 2 with greater particularity, our transporting rack 10 is shown mounted on the bed 12 of a truck 14. However, it is to be understood that other freight transporting means such as railway cars are equally adapted for use with our invention. In any event, the rack 10 is made up of a plurality of transverse "A" frames 16 which are secured together in longitudinal alignment as by welding the lower ends of the legs to full length angles 18 and securing an inverted channel to function as a full length cap 19. In addition, a plurality of intermediate crossbar braces 20 and a plurality of bottom cross members 22 provide additional strength transversely. The bottom cross braces 22 preferably extend beyond the legs of the A-frame to provide support for shelves 24 which extend the length of the rack 10.

A plurality of generally horizontal back support bars or slats 26 which are preferably of wood to provide some resilience are secured to the "A" frames and a plurality of diagonal braces 28 which converge toward the top of the frame are secured between top and bottom of the rack to provide additional strength for lifting transporting of the rack while suspended.

Secured at the top center of the rack as by welding to the channel cap 19 is a load carrying bar 30 to which a suspension member 32 is releasably secured as by inserting bolts 34 or the like through slots 36 in a complementary inverted U-shaped member 38 in selected ones of bolt holes 40 in the load carrying bar 30. A chain 42 is secured at opposite ends of the suspension channel 38 and a gripping member or eye 44 which is provided with a narrow slot-like portion 46 at its lower end of a width to accommodate the thickness of a chain link so that it may be placed in a selected position along the length of the chain and locked against movement. Thus, the load carrying member 38 may be secured at any position along the length of the bar 30 and then the chain itself is gripped in a selected position along its length in order to compensate for an unbalanced load which naturally develops when glass sheets G of various sizes have to be placed along the length of the rack.

When the glass sheets are loaded onto the supporting ledge 24 and leaned against the longitudinal slats 26, they are secured in place by means of a suitable elongated pressure bearing member 48 which is held in form, frontal engagement with the glass sheets G by suitable clamping means 50 hereinafter to be described. When the rack 10 is loaded and placed on the bed of a truck it is secured in place by engagement of bolts 52 with the bottom transverse members. The specific structure of the bolting arrangement will be described hereinafter in greater detail.

Referring now to FIGS. 3 and 4, the transverse pressure member may simply comprise a length of wood 54, such as a 2 x 4, preferably with a resilient bearing member 56 covering that side which engages the glass sheets G. The pressure member is carried in and between an aligned pair of channel members 58, each of which depends from an upright slide member 60 which is movable along a rod or other slideway 62 carried on one leg 64 of a bifurcated mounting portion 66 having two depending legs 64 and 68 which snugly embrace the sides of a vertical back support slat 26. The slide member 60 carrying the channel member is releasably secured in place along the rod by any suitable quick release clamping mechanism indicated generally at 70.

In operation, the 2 x 4 pressure member is simply placed within the rearwardly facing channel members 58 and the bifurcated support members are moved along the slat on which they are carried to the positions desired, depending upon the width of the glass panels G being loaded. Then the slideway 60 is moved rearward along the circular rod 62 until the pressure member 48 bears firmly against the glass G to prevent any vibration. Then, the slide 60 is secured in place by operation of the locking means 70. The clamp illustrated is commercially available, and includes a series of discs 71 which engage the rod 62 frictionally but which may be released by turning them into upright position.

Referring now to FIGS. 5 and 6, we have illustrated the means for securing the rack in place on the bed of the truck. As shown there, the truck bed 12 is recessed at 74 to form a receptacle 76 in which the bolt 52 is pivotally mounted as by rotatably mounting an integral bearing 78 on a stub shaft 80 extending across the receptacle 76. Thus, when disengaged, the bolt is disposed in its retracted position shown in phantom in FIG. 5, leaving the truck bed 12 free. To secure the rack in place, the bolts 52 are pivoted upward to the solid line position wherein they engage in complementary slots 82 opening in lock bars 84 which, in turn, are welded or otherwise secured to the bottom cross members 22 of the "A" frame 16 at opposite ends of the rack 10. Then, simply by tightening the nuts 86, the rack is held firmly in place against the truck bed 12. As shown in FIGS. 1 and 2, the bolt recesses 76 are placed on the truck bed in proper spacing so that the bolts 52 will engage two slotted bars 84 at each end of the rack.

Summarizing the operation of our glass carrying rack 10, the truck 14 arriving at the warehouse (not shown) need be detained just long enough to remove an empty rack 10 and replace it with a previously loaded one. This is accomplished by loosening the four nuts allowing the bolts 52 to drop into their recesses 76, and then attaching the lifting chain 42 to remove the empty rack as by engaging the eye 44 with a suitable lifting mechanism (not shown). The empty rack is carried into the warehouse to be reloaded and a previously loaded rack is immediately carried back out to the truck 14 where it is lifted into place so that the slotted bars 84 are in position to receive the four bolts 52. The nuts 86 are tightened and the rack and truck are ready for departure to the next destination. Following this, the previously removed rack is loaded with the sheets of glass required for a subsequent delivery; the clamping members 50 are dropped over an appropriate one of the cross slats 26 and the slide member 60 is pushed along the rod 62 so that the pressure member 48 bears firmly against the glass G in place.

Referring now to FIGS. 7 and 8, we have illustrated a special type of rack which is adapted for carrying large glass panes. As shown, one of the legs of "A" frame 16a extends an appreciable distance below the other one and is so disposed that, when clamped in place on the truck bed 12, it clears the side of the truck 14 and extends below the level of the bed 12. As shown in FIGS. 7 and 8, two pressure-bearing members 48 are preferably employed, but this is not unique with this particular structure. Obviously, two or more pressure members may be employed with the rack of FIGS. 1 and 2, again depending upon the size of the glass sheets G being carried.

Referring now to FIGS. 7–10, it is frequently desirable to clamp the glass rack 10 to a truck bed at a location intermediate the length of the rack, and this is particularly true in the case of long racks. It is obvious, however, that the placement of glass sheets on the rack, and particularly if sheets are carried on both sides of the rack, there is a problem of access to securing means intermediate the ends. Therefore, we have provided a pair of hook-like members which are pivotally mounted at 92 on an intermediate cross brace 22 on the rack to engage through slots 96 in the bed panel 12 and engage under the bed. The hooks may be operated by any suitable linkage, and, for this purpose, we have interconnected the tops of the pivotable hooks by means of a transverse rod 98 (FIG. 10) which, in turn, is pivotally connected to a link 100 that may be guided and slidably supported in a fork guide 101. The link 100 extends to the end of the rack where it is pivotally connected to an arm 102 which, in turn, is pivoted at 104 in a pivot mounting 106 secured on the end "A" frame cross member 22. If desired, a turnbuckle 108 may be provided to adjust the precise length of the link. Thus, an operator standing at the rear of the truck 14 can clamp the intermediate portion of the rack 10a simply by pulling the arm 102.

Referring to FIG. 11, we have illustrated a dolly 110 which is particularly adapted to accommodate the "long leg rack" of FIGS. 7 and 8, it being high enough to support the bottom cross members 22 of the "A" frame and still accommodate the low depending leg 16a. The hook mechanism may be employed to secure the rack in place on the dolly as by engagement under a center cross member 111. The dolly is rendered portable by a plurality of wheels 112 carried on transverse bars 114 and some of the wheels at one end of the rack are preferably swivel-mounted to facilitate maneuverability of the rack. It will be noted that the wheel support bars 114 extend beyond one side of the rack and have an upturned abutment 116 which is adapted to engage the glass support shelf 24 to prevent the rack 10a from sliding laterally off the dolly.

While this invention has been described in conjunction with preferred embodiments thereof, it is obvious that some modifications and changes therein may be made by those skilled in the art without departing from the spirit and scope of the invention.

Having described our invention, we claim:

1. The combination of a rack for transporting sheets of glass or the like and a vehicle comprising:
   said rack having at least two generally parallel, transverse "A" frame members at opposite ends thereof,
   a plurality of flat, elongated members secured to and extending between corresponding legs of said frame members,
   a sheet-supporting shelf extending outward at the lower end of at least one pair of said corresponding legs,
   said vehicle having a flat, load-bearing surface,
   releasable interlocking means on said surface and the lower ends of both of said frame members,
   an elongated strength member secured to and between the tops of said frame members,
   a support bar secured to and extending along said strength member,
   a tension member,
   means for releasably securing the ends of said tension member in selected positions along said support bar,
   a grip member having means thereon engageable by a lifting device, and
   interengageable means on said grip member and said tension member for securing said grip member in selected positions along said tension member.

2. The combination defined by claim 1 wherein said releasable securing means comprises:
   a connection bar,
   a chain forming said tension member secured at opposite ends to the ends of said connection bar, and
   releasable means for securing said connection bar to said support bar at selected positions along the length thereof.

3. The combination defined by claim 2 including:
   means forming a slot in said grip member of a width to accommodate the thickness of a link of said chain.

4. The combination defined by claim 1, including:
   a hook mounted at the lower end of said rack intermediate said frame members to pivot thereon in an upright plane,
   complementary means on said flat surface engageable by said hook, and
   a linkage operable from one end of said rack for interegaging said hook and said complementary member.

5. The combination defined by claim 1 wherein said interlocking means comprises:
   means forming receptacles on said vehicle recessed below said flat surface,
   bolt means pivotally mounted on said vehicle for movement between a retracted position within said receptacles and an extended position protruding therefrom, and
   complementary slotted members on said frame members engageable by said bolt means.

6. The combination defined by claim 1 including:
   complementary interengageable securing means on the lower end of said rack intermediate the ends thereof and said flat surface, and
   motion transmitting means on said rack extending from said securing means to one end of said rack for operation therefrom to engage said securing means.

7. A rack for transporting sheets of glass or the like comprising:
   at least two generally parallel, spaced transverse "A" frame members,
   a plurality of flat, elongated members secured to and extending between corresponding legs of said frame members,
   a sheet-supporting shelf extending outward at the lower ends of at least one pair of said corresponding legs,
   an elongated strength member secured to and between the tops of said frame members, and
   the rack including sheet restraining means comprising:
   a pair of elongated U-shaped slide members engaged on one of said flat, elongated members,
   a mounting rod extending outward from each of said slide members,
   a retaining member slidably carried on each of said mounting rods,
   an elongated pressure member supported adjacent opposite ends thereof in said retaining members, and
   means for locking said retaining members in adjusted positions along said mounting rods.

UNITED STATES PATENTS
References Cited

| | | | |
|---|---|---|---|
| 976,572 | 11/1910 | Jeffery | 296—35 |
| 3,027,025 | 3/1962 | Tantlinger | 214—10.5 X |
| 3,233,753 | 2/1966 | Rich | 211—13 X |
| 1,836,362 | 12/1931 | Crowley | 294—63 |
| 2,978,270 | 4/1961 | Verheggen | 294—67 |

EVON C. BLUNK, *Primary Examiner.*

ROBERT D. GUIOD, *Assistant Examiner.*

U.S. Cl. X.R.

211—41, 113; 296—3, 35